United States Patent [19]

Takada et al.

[11] Patent Number: 4,486,083
[45] Date of Patent: Dec. 4, 1984

[54] EXPOSURE COUNTER DISC MECHANISM FOR CAMERAS

[75] Inventors: Jun Takada; Yukio Takaoka, both of Tokyo, Japan

[73] Assignee: Asahi Kogaku Kogyo Kabushiki Kaisha, Tokyo, Japan

[21] Appl. No.: 415,197

[22] Filed: Sep. 7, 1982

[30] Foreign Application Priority Data

Sep. 7, 1981 [JP] Japan ............................ 56-132871[U]
Sep. 16, 1981 [JP] Japan ............................ 56-137276[U]

[51] Int. Cl.³ ............................................ G03B 17/36
[52] U.S. Cl. .................................. 354/203; 354/217; 354/288
[58] Field of Search ............ 354/203, 217, 218, 289.1, 354/288

[56] References Cited

U.S. PATENT DOCUMENTS 3,426,665  2/1969  Maeda ................................. 354/203
3,722,386  3/1973  Furuta ................................ 354/217
3,754,460  8/1973  Tanaka ............................... 354/203

Primary Examiner—A. A. Mathews
Attorney, Agent, or Firm—Sughrue, Mion, Zinn, Macpeak & Seas

[57] ABSTRACT

A camera is equipped with a back cover containing an exposure counter mechanism including a gear member in both frictional and gear toothed engagement with a film feeding sprocket of the camera. To accommodate films of different thickness and lengths, the cover is replaceable with another having a different pressure plate, and the counter disc has indicia for counting up to 72 frames.

9 Claims, 5 Drawing Figures

EXPOSURE COUNTER DISC MECHANISM FOR CAMERAS

BACKGROUND OF THE INVENTION

The present invention relates to an exposure counter disc mechanism for a camera which is constructed to gain exposure count information directly from the rotation of a sprocket at the time of film windup, and to a camera back cover construction including the same.

Prior exposure counter disc mechanisms are known which obtain exposure count information via a roller from a sprocket and a shaft rotatable upon film windup, the roller being rotatable by friction with the film. When the film is fed at a high rate as by a motor drive, the roller and the film tend to slip with respect to each other causing over-lapped exposure frames and a discrepancy between the number of film frames acutally fed and the indication on the exposure counter. Such an exposure counter disc mechanism can count up to a maximum of 36 consecutive film frames. When a camera equipped with such an exposure counter disc mechanism is loaded with a film of more than 36 frames such as a film having 72 frames, up to 36 frames can be counted and the rest cannot. Films having more than 36 frames such as 72-frame films are composed of thinner film bases as they are placed in conventional cartridges for 36-frame films. Rails in the camera which are constructed for use with 36-frame films fail to allow such thinner-base films to fit snugly in the film passage, with the result that the film tends to slacken. Image focusing on the film is adversely effected by such film slackening.

SUMMARY OF THE INVENTION

The present invention has been made to eliminate the foregoing difficulties. It is an object of the present invention to provide an exposure counter disc mechanism for a camera which has a member rotatable with a roller and held in mesh with the film feed teeth of a sprocket for correcting any error due to slippage between the roller and the film to thereby effect the proper transmission of rotation of the sprocket.

It is a further object of the present invention to provide a camera back cover having an exposure counter disc mechanism for gaining information as to film feeding and winding from a sprocket, and a pressure plate including a step which suits a given film base thickness, the back cover being replaceable with another to adapt itself to a film of more than 36 frames.

BRIEF DESCRIPTION OF THE DRAWINGS

The present invention will now be described with reference to the drawings, in which.

DETAILED DESCRIPTION OF THE PREFERRED EMBODIMENTS

An exposure counter disc 2 is rotatably mounted on a back cover 1 of a camera by an exposure counter disc collar 3. The exposure counter disc 2 is urged by an exposure counter disc spring 4 to turn in the clockwise direction in FIG. 1. The exposure counter disc 2 has teeth on its outer circumferential edge.

Figure 1:
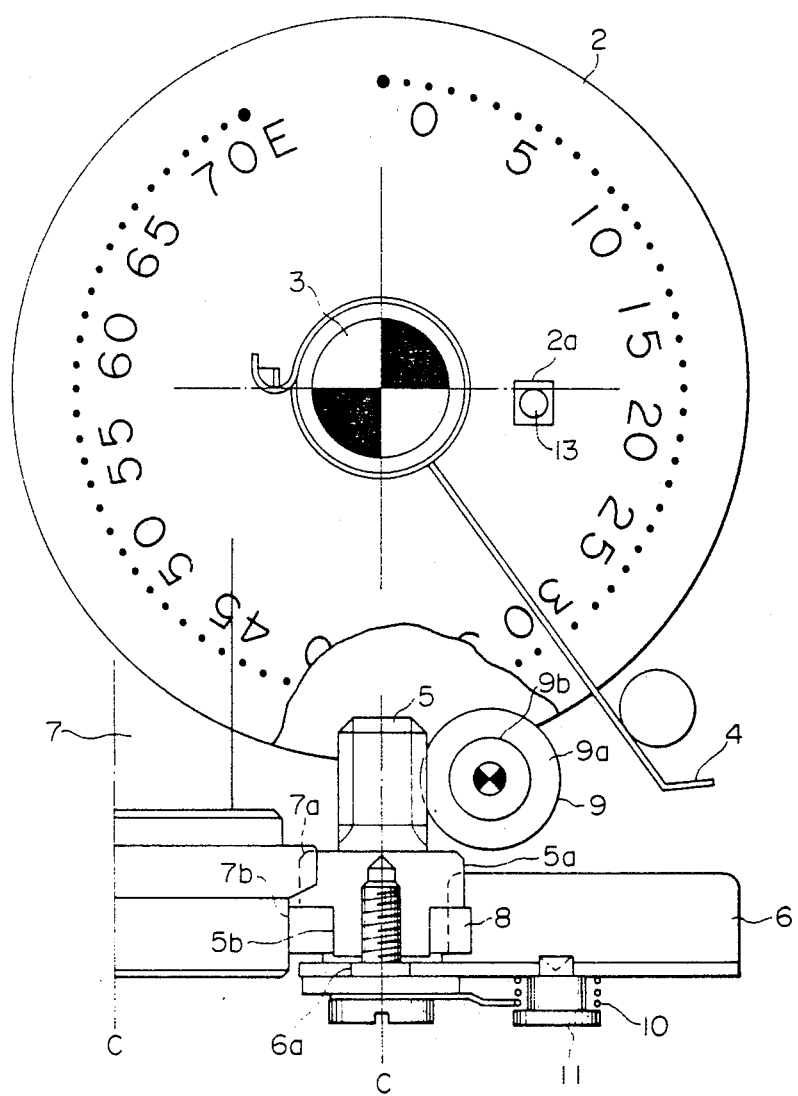
FIG. 1 is a front elevational view of an exposure counter disc mechanism as viewed through a back cover.
Figure 2:
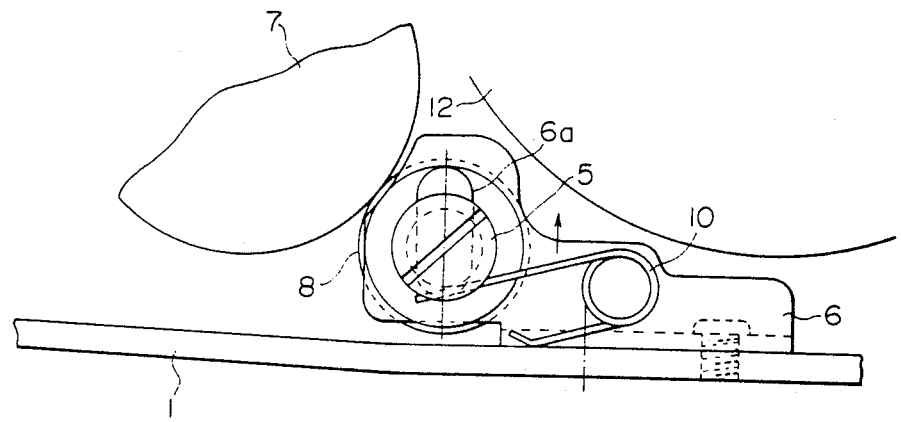
FIG. 2 is a bottom view of the exposure counter disc mechanism with the back cover closed.
Figure 4:
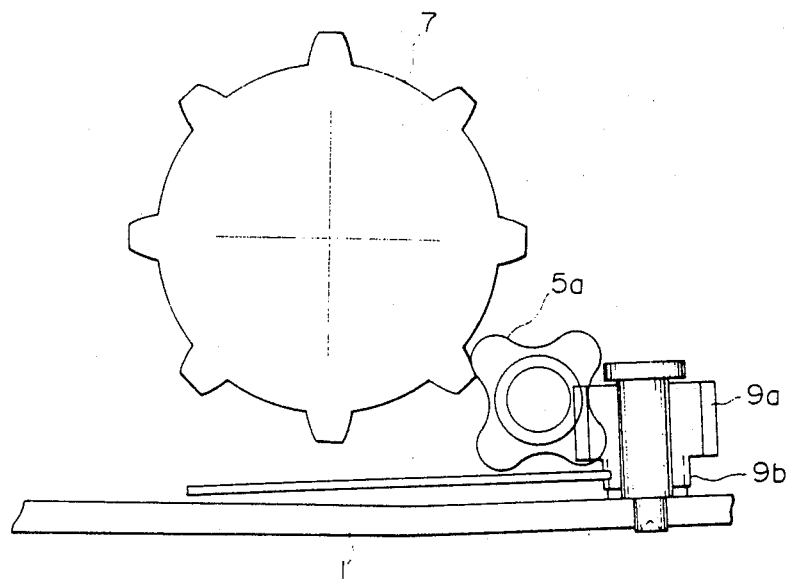
FIG. 4 is a plan view of the exposure counter disc mechanism with the back cover closed.

A worm gear 5 is rotatably mounted in and slidably movable along an oblong hole or slot 6a defined in a base plate 6 mounted on the back cover 1. The worm gear 5 is urged by a return spring 10 to move in the direction of the arrow in FIG. 2, the return spring 10 being supported on a return spring retainer 11. The worm gear 5 has on one end (the central portion as shown in FIG. 1) lobe-shaped teeth 5a (FIG. 4) which are held in mesh with film feed teeth 7a of a sprocket 7 on the camera body when the back cover 1 is closed. The other end 5b (the lower end as shown in FIG. 1) of the worm gear 5 has a rubber friction member 8 (a roller) fitted thereon. With the back cover 1 closed, the rubber friction member 8 is pressed against an end 7b of the sprocket 7 to transmit rotation of the latter to the worm gear 5 due to the friction between the rubber member 8 and the sprocket 7.

A worm sheet 9 is rotatably mounted on the back cover 1 and is of a double-gear design including a larger-diameter gear 9a meshing with the worm gear 5 and a smaller-diameter gear 9b meshing with the teeth on the exposure counter disc 2.

When the back cover 1 is moved to the closed position, the friction member 8 fitted over the worm gear 5 is brought into contact with the end 7b of the sprocket 7. As the back cover 1 is further closed, the worm gear 5 is slid along the slot 6a in the base plate 6. Upon the back cover 1 being completely closed, the worm gear 5 is held in mesh with the larger-diameter gear 9a of the worm wheel 9. At this time, the rubber friction member 8 is pressed against the end 7b of the sprocket 7 under the resilient force of the return spring 10.

In the film windup operation, a known mechanism rotates the sprocket 7 to feed the film and simultaneously the friction member 8 is rotated. Any slippage between the friction member 8 and the end 7b of the sprocket 7 is compensated for by the meshing engagement between the teeth 5a of the worm gear 5 and the film feed teeth 7a of the sprocket 7. The rotation of the sprocket 7 is thus transmitted accurately to the worm wheel 9 through the worm gear 5, whereupon the exposure counter disc 2 is rotated by the smaller-diameter gear 9b of the worm wheel 9, to advance the exposure counter disc 2 an interval corresponding to a single frame.

The exposure counter disc 2 has a tooth-free portion on its circumferential edge corresponding to film frames beyond 72 frames, so that the exposure counter disc 2 will not be rotated by the worm gear 9b more than 72 frames.

Figure 3:
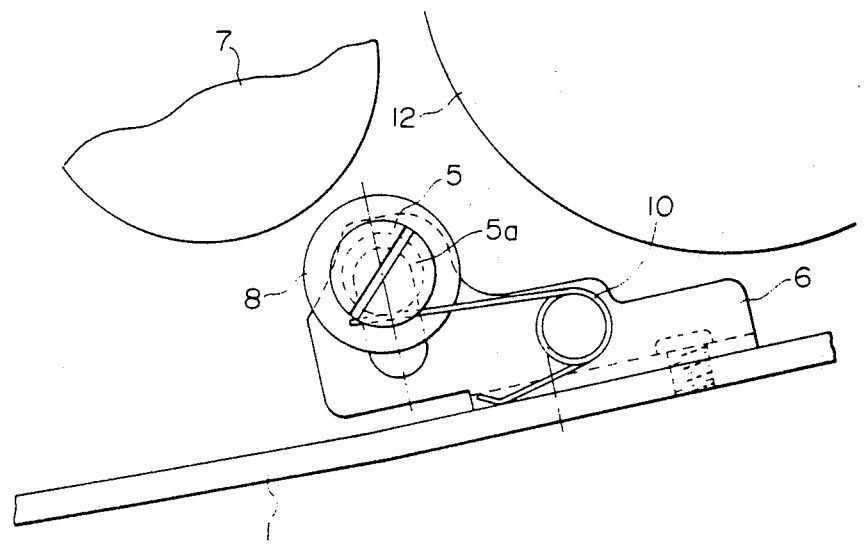
FIG. 3 is a bottom view of the exposure counter disc mechanism with the back cover open.

FIG. 3 shows the back cover 1 when slightly open. when the back cover 1 is opened, the worm gear 5 is displaced out of meshing engagement with the larger-diameter gear 9a of the worm wheel 9 as the worm gear 5 is moved along the slot 6a in the base plate 6 under the force of the return spring 10. Then, the exposure counter disc 2 is allowed to rotate with the worm wheel 9 under the force of the spring 4 until a protruding member 2a on the exposure counter disc 2 engages an exposure counter disc stopper member 13 embedded in the back cover 1, whereupon the exposure counter disc 1 is returned to its original position. Designated in FIGS. 2 and 3 at 12 is a spool.

Figure 5:
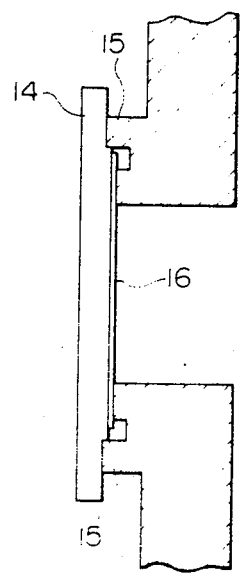
FIG. 5 is a cross-sectional view of a pressure plate.

FIG. 5 shows a pressure plate in cross section. Since the 36-frame film and the 72-frame film have different film base thicknesses, as described above, the film having the thinner film base will not be positioned where the image is focused by the lens unless the film passage is changed, with the consequence that the picture taken will be out of focus. To provide a proper film passage which suits a film 16 having a thinner film base, the pressure plate 14 has a raised step extending between the rails 15, 15 of the camera body.

With the present invention as described above, more than 36-film frames can be counted and a different film passage accommodating varying film base thicknesses can be provided by simply changing a replaceable back cover of the camera when a film of more than 36 frames is used. Exposure count information is gained directly from the sprocket, and since the sprocket would not rotate upon an overlapped exposure, the exposure counter disc would not rotate either. The exposure counter disc will rotate accurately in a camera capable of yielding exposures of both half-frame and full-frame sizes. At the time of rewinding the film, the exposure counter disc can be rotated back to any desired position as its rotation is governed by the length of the film which is wound back.

What is claimed is:

1. An exposure counter disc mechanism for a camera, comprising:
   a sprocket comprising an axial portion having circumferential film feed teeth for feeding film and a circular portion;
   a roller pressed against the circular portion of said sprocket;
   a gear having gear teeth held in mesh with said film feed teeth of said sprocket and rotatable in synchronism with said roller for correcting rotation transmission error due to slippage of said roller with said circular portion; and
   means for transmitting rotation of said gear and said roller to a graduated dis, said disc being said counter disc.

2. A mechanism as claimed in claim 1, wherein said disc has circumferential teeth and said transmitting means comprises a worm gear integral with said gear teeth, and a worm wheel having teeth in mesh with said teeth of said disc and with said worm gear.

3. A mechanism as claimed in claim 1, wherein said roller is mounted on said gear, said gear and said roller being slidable transversely to a common axis thereof, whereby the rotation of said sprocket is decoupled from said disc.

4. A mechanism as claimed in claim 3, further including means for biasing said roller and said gear into contact with said circular portion and said film feed teeth respectively.

5. A mechanism as claimed in claim 4, said biasing means comprising spring means urging said roller and said gear transversely to maintain engagement with said sprocket.

6. A mechanism as claimed in claim 1, wherein the camera is of the type having a back cover and said mechanism further includes a flat detachable pressure plate in said back cover, said pressure plate having a fixed selectable thickness.

7. A back cover having an exposure counter disc mechanism for a camera of the type including a sprocket for feeding film, including a circumferential film feed gear and a circular portion, said back cover comprising:
   a roller pressable against the sprocket at said circular portion thereof when the back cover is closed;
   a gear having teeth meshing with said film feed gear of the sprocket and rotatable in synchronism with said roller for correcting rotation transmission error due to slippage of said roller with said circular portion;
   an exposure counter disc rotatably connected to said gear; and
   a flat pressure plate having a step of selectable fixed thickness, said cover being detachable from said camera, whereby a cover can be used to suit a film having a film base of a particular thickness.

8. A back cover as claimed in claim 7, said pressure plate of said cover being sized and positioned on said back cover to accommodate a film of a particular thickness.

9. A mechanism as claimed in claim 6, said pressure plate having a flat stepped portion, said camera including a body, said body including guide rails partially defining a film passage, and said stepped portion fitting closely between said guide rails and slightly inwardly thereof, to provide a film passage between said body and said stepped portion to suit films having a relatively thin film base.

* * * * *